United States Patent
Nanjo et al.

(10) Patent No.: US 12,385,749 B2
(45) Date of Patent: Aug. 12, 2025

(54) ENERGY CALCULATING APPARATUS

(71) Applicant: DENSO CORPORATION, Kariya (JP)

(72) Inventors: Hiroyuki Nanjo, Kariya (JP); Noriaki Ikemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 68 days.

(21) Appl. No.: 18/536,310

(22) Filed: Dec. 12, 2023

(65) Prior Publication Data

US 2024/0192003 A1     Jun. 13, 2024

(30) Foreign Application Priority Data

Dec. 13, 2022 (JP) .................................. 2022-198385

(51) Int. Cl.
    *G01C 21/34*     (2006.01)
    *B60L 58/13*     (2019.01)

(52) U.S. Cl.
    CPC .......... *G01C 21/3469* (2013.01); *B60L 58/13* (2019.02); *G01C 21/3415* (2013.01); *G01C 21/3492* (2013.01); *B60L 2240/68* (2013.01); *B60L 2260/52* (2013.01)

(58) Field of Classification Search
    CPC ............ G01C 21/3469; G01C 21/3415; G01C 21/3492; B60L 58/13; B60L 2240/68; B60L 2260/52
See application file for complete search history.

(56) References Cited

U.S. PATENT DOCUMENTS

| | | | |
|---|---|---|---|
| 2014/0207363 A1* | 7/2014 | Kanno | G01C 21/3469 701/123 |
| 2016/0325637 A1* | 11/2016 | Payne | B60L 50/16 |
| 2022/0291286 A1* | 9/2022 | Narimoto | G01R 31/374 |

* cited by examiner

*Primary Examiner* — Jacob M Amick
(74) *Attorney, Agent, or Firm* — Oliff PLC

(57) ABSTRACT

An energy consumption predicting apparatus stores reference energy defined by an amount of energy required by a vehicle to move on a selected route and provides actual energy defined by an amount of energy actually used by a target vehicle. The apparatus includes a correcting unit which calculates a deviation of the actual energy from the reference energy and derives a correlation between amounts of energy actually consumed by a vehicle to move from a reference location to a first location and from the reference location to a second location. When the correlation is higher than a given value, the correcting unit determines the second location as a correction location, determines a correcting parameter as a function of the deviation derived at the correction location, and corrects the reference energy using the correction to predict an amount of energy consumed by the target vehicle until a target location is reached.

10 Claims, 16 Drawing Sheets

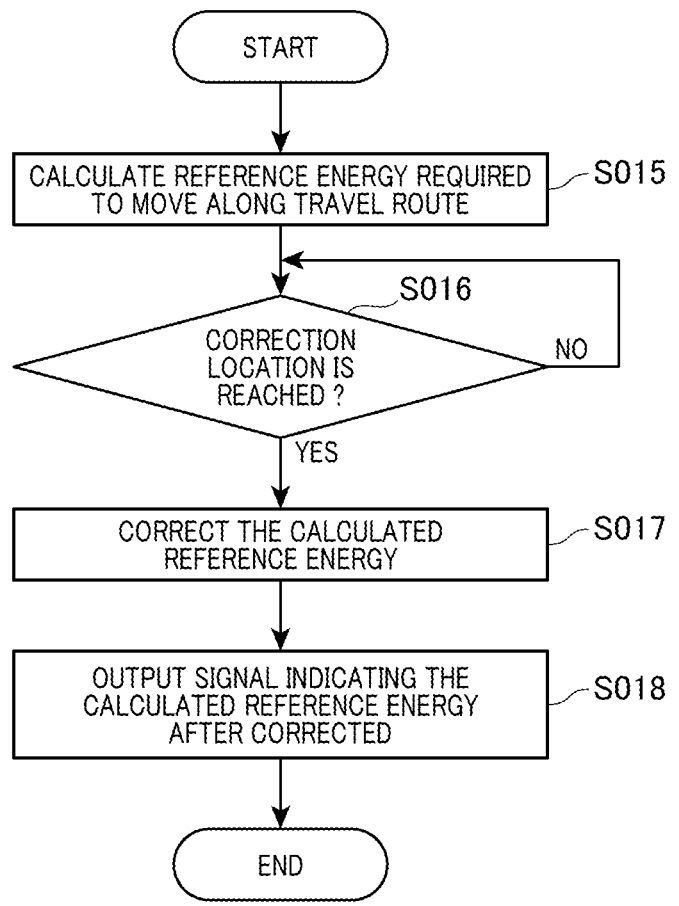

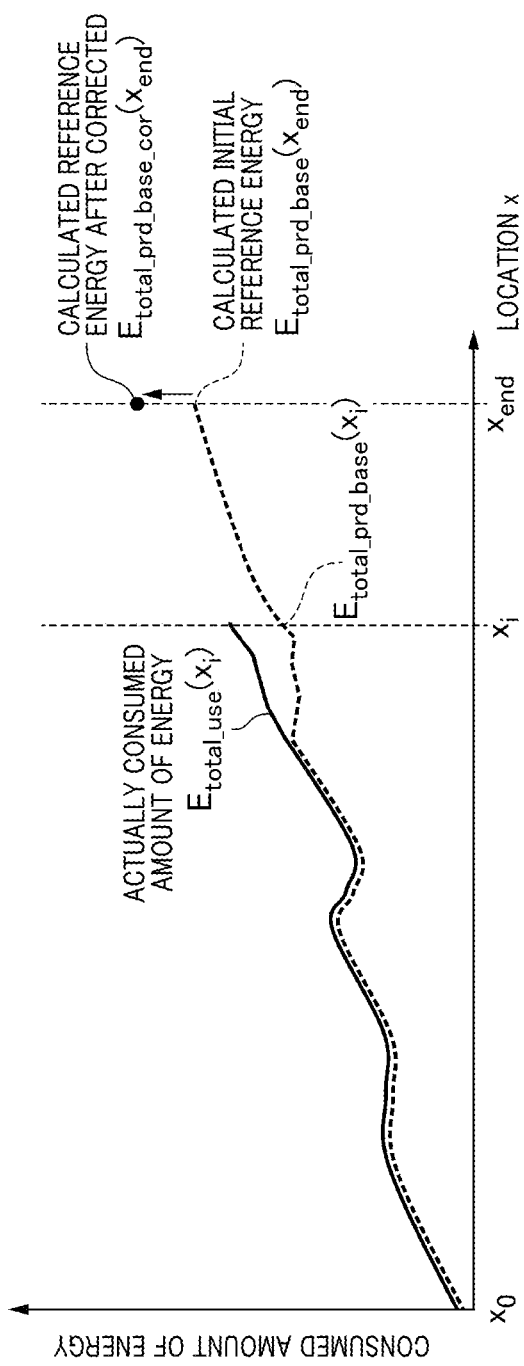

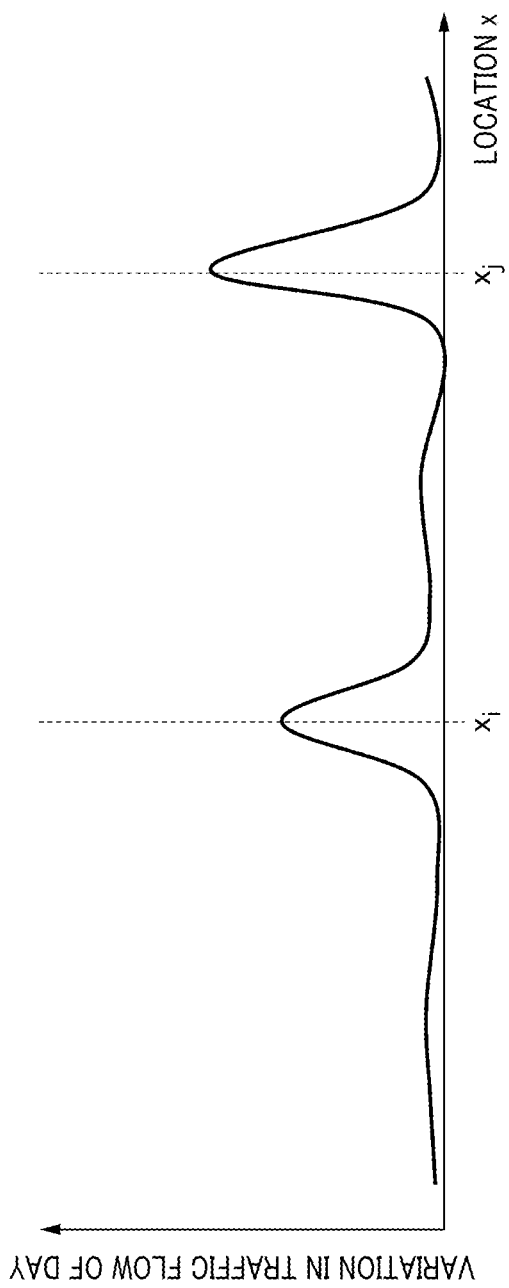

ENERGY CALCULATING APPARATUS

CROSS REFERENCE TO RELATED DOCUMENT

The present application claims the benefit of priority of Japanese Patent Application No. 2022-198385 filed on Dec. 13, 2022, the disclosure of which is incorporated in its entirety herein by reference.

BACKGROUND

1 Technical Field

This disclosure relates generally to an energy calculating apparatus.

2 Background Art

Japanese Patent First Publication No. 2012-255757 discloses a device for predicting or calculating an amount of energy consumed by an automotive vehicle. The energy consumption calculating device taught in this publication is designed to divide a path of travel of the vehicle into a plurality of path segments, predict an amount of energy expected to be consumed in each path segment, and correct the predicted amount of energy using an amount of energy actually consumed in each path segment.

A pattern of the consumption of energy in one of the path segments is frequently different from that in a following one of the path segments. This may result in insufficient correction of the predicted amount of energy.

SUMMARY

It is an object of this disclosure to provide an energy prediction apparatus which predicts or calculates a consumed amount of energy with high accuracy regardless of a change in tendency of consumption of energy.

According to one aspect of this disclosure, there is provided an energy consumption predicting apparatus which comprises: (a) an energy information retaining unit which retains therein reference energy information which represents reference energy defined by an amount of energy expected to be required by a vehicle to move along a selected travel route; an energy information generator 101 which generates actual energy information which represents actual energy defined by an amount of energy actually used by a target vehicle when the target vehicle has moved along the selected travel route, the target vehicle being a vehicle whose consumption of energy is required to be predicted; and (c) a correcting unit which works to calculate a deviation parameter which represents a deviation of the actual energy from the reference energy. The correcting unit derives a correlation factor that is a function of a correlation between an amount of energy actually consumed by a vehicle to move from a reference location to a first location and an amount of energy actually consumed by a vehicle to move from the reference location to a second location. When the correlation factor is higher than a given value, the correcting unit determines the second location as a correction location and determines a correcting parameter as a function of the deviation parameter derived at the correction location. The correcting unit corrects the reference energy using the correction factor to produce predicted energy information representing an amount of energy predicted to be consumed by the target vehicle until a target location that is the first location is reached.

The above structure enables the reference energy information to be corrected at an optimum time (i.e., correction time) which ensures the high accuracy of prediction of an amount of energy consumed by the target vehicle regardless of a variation in actually consumed amount of energy.

BRIEF DESCRIPTION OF THE DRAWINGS

The present disclosure will be understood more fully from the detailed description given hereinbelow and from the accompanying drawings of the preferred embodiments, which, however, should not be taken to limit the invention to the specific embodiments but are for the purpose of explanation and understanding only.

In the drawings:

FIG. 11 is a flowchart of a sequence of tasks in a correction operation executed by the energy consumption predicting apparatus shown in FIG. 1;

FIG. 12 is a graph which demonstrates how to calculate a consumed amount of energy;

FIG. 13 is a graph which demonstrates an example of how to determine a correction location on a selected travel route;

DESCRIPTION OF THE PREFERRED EMBODIMENT

An embodiment will be described below with reference to the drawings. For facilitating the understanding of this disclosure, the same or similar reference numbers or symbols throughout the drawings refer to the same or similar parts, and a repeated explanation will be omitted here.

Figure 1:
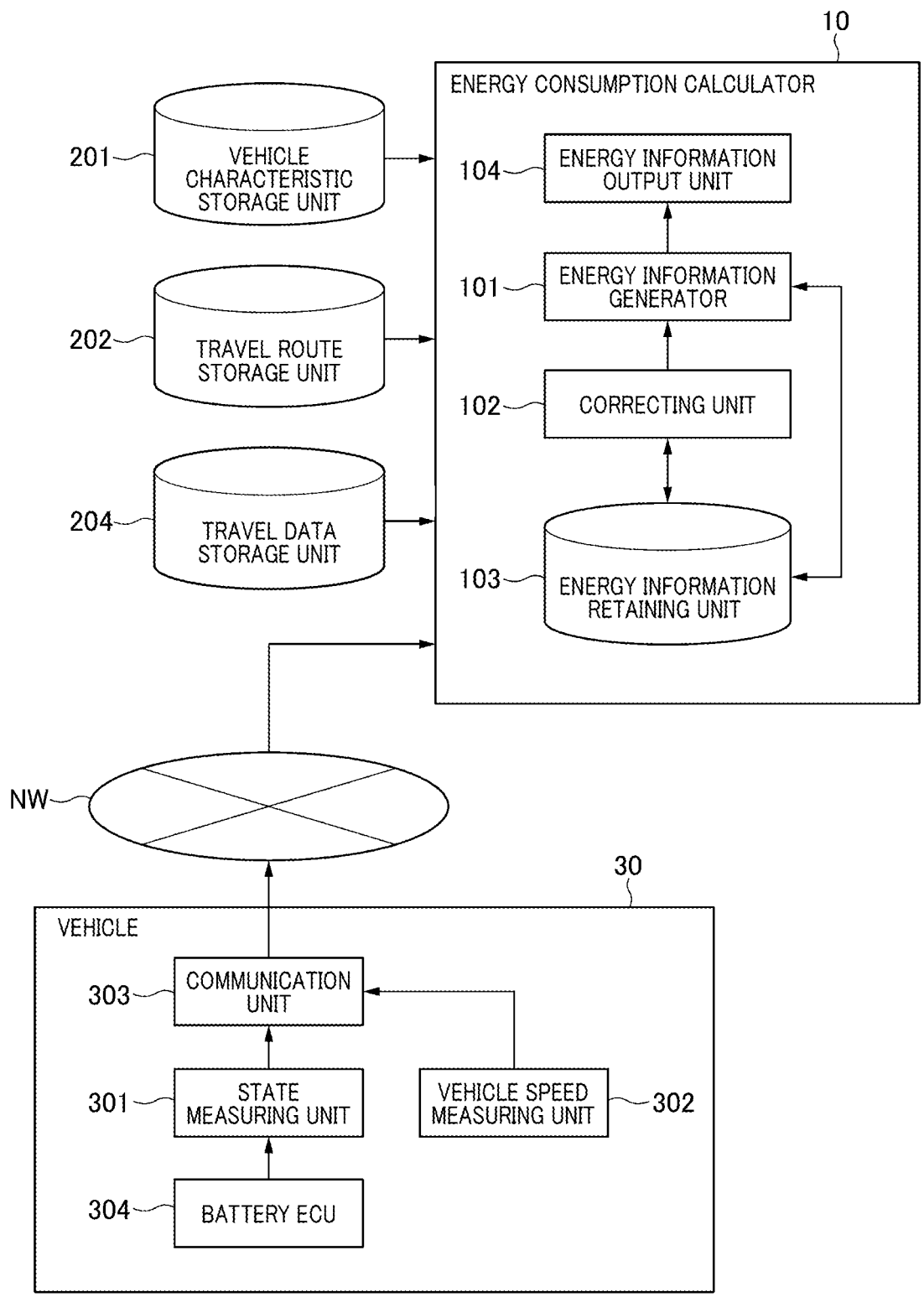
FIG. 1 is a block diagram which illustrates an energy consumption predicting apparatus according to an embodiment.

Referring to FIG. 1, the energy consumption predicting apparatus 10 in this embodiment is implemented by a computer made up of hardware components, such as an arithmetic circuit, e.g., a CPU (Central Processing Unit), storage devices, e.g., a RAM (Random Access Memory) and a ROM (Read Only Memory), and an interface through which data is transmitted between the arithmetic circuit and the storage devices.

The energy consumption predicting apparatus 10 includes functional units: the energy information generator 101, the correcting unit 102, the energy information retaining unit 103, and the energy information output unit 104. The energy consumption predicting apparatus 10 is designed to predict or calculate a total amount of electrical energy required by a target vehicle, such as a passenger car or a truck, to move from a first location (e.g., a start location) to a second location (e.g., a destination) along a travel route set in a navigation system installed in or outside the target vehicle. The travel route from the first location to the second location may alternatively be determined or selected by a logistics management system for transportation trucks.

The energy information generator 101 works to generate actual energy information about an amount of electrical energy which has been actually consumed by a target vehicle when moving along a selected travel route on a road.

The energy information retaining unit 103 retains or stores reference energy information about an amount of electrical energy (which will also be referred to below as reference energy) expected to be required in a vehicle to travel to a given point or location along the selected travel route on the road. Specifically, the energy information retaining unit 103 is configured to retain, as the reference energy information, the reference energy (which will also be referred to as first reference energy) that is an amount of electrical energy expected to be required for a vehicle (e.g., a typical vehicle) to move from a start location (which will also be referred to as a current location or a reference location) to a first location (i.e., a destination which will also be referred to as a target location) along the selected travel route on the road. The energy information retaining unit 103 is also configured to retain correlation information (also referred to below as location-to-location correlation information) representing a correlation (also referred to as location-to-location correlation) of a first amount of energy actually used by a vehicle to reach the first location (which will also be referred to as an actual energy consumption) with a second amount of energy actually used by the vehicle to reach a second location (which will also be referred to as an actual energy consumption) along the selected travel route from the start location on the road. The energy information retaining unit 103 is also capable of retaining information which is used to calculate the amount of reference energy and to determine a reference speed pattern that is a pattern of a reference speed (i.e., a typical speed) of a vehicle(s) moving until the first location on the road.

The correcting unit 102 works to correct the amount of reference energy as a function of a deviation parameter representing a deviation between an actually consumed amount of energy and the amount of reference energy. The correcting unit 102 determines a location on the road where a given correlation (which will be described later in detail) is determined to be high as a correction location where the correction unit 102 is capable of determining a correction parameter, as will be described later in detail, which is used to correct the reference energy information, thereby determining predicted energy information representing an amount of energy required by the target vehicle to move from the start location to a specified destination on the selected travel route.

The correcting unit 102 also determines, as the deviation parameter, a difference between the reference energy (which will also be referred to as second reference energy) that is an amount of energy required by a vehicle to reach the second location which is closer to the start location than the first location is on the selected travel route and an amount of electrical energy actually consumed by the target vehicle to reach the second location on the road. When the deviation parameter is greater than a given value, the correcting unit 102 corrects the reference energy information (i.e., the second reference energy) to produce the predicted energy information. The correcting unit 102 is capable of determining the point-to-point correlation using the point-to-point correlation information.

When determining that a change in traffic state at the second location is greater than that in other locations, the correcting unit 102 determines the second location as a correction location. Alternatively, when determining that a change in pattern of a speed of a vehicle(s) at the second location is greater than that in other locations, the correcting unit 102 may determine the second location as the correction location. Alternatively, when determining that a deviation of an amount of energy actually consumed to travel to the second location from the reference energy is greater than that to other locations, the correcting unit 102 may determine the second location as the correction location.

The correcting unit 102 may determine, as the deviation parameter, a difference between a pattern (which will also be referred to as reference speed pattern) of a given reference vehicle speed (i.e., a typical vehicle speed) between the start location and the second location which is closer to the start location than the first location is on the road and a pattern (which will also be referred to as actual speed pattern) of speed at which the target vehicle has actually moved to the second location. When the deviation parameter is greater than a given value, the correcting unit 102 may correct the reference energy information to produce predicted energy information.

The energy information output unit 104 serves to output the predicted energy information produced by the correcting unit 102. The energy information output unit 104 transmits the predicted energy information to the target vehicle 30, but however, may be designed to send it to another device.

The vehicle characteristic storage unit 201 stores vehicle characteristic information therein. The vehicle characteristic information will be described later in detail. The travel route storage unit 202 stores travel route information therein. The travel route information will be described later I detail.

The vehicle 30 is a target vehicle whose consumption of electrical energy is to be predicted or calculated by the energy consumption predicting apparatus 10. The energy consumption predicting apparatus 10 communicates with the vehicle 30 using a network NW. The vehicle 30 transmits travel data thereof to the energy consumption predicting apparatus 10 using the network NW. The energy information retaining unit 103 stores the travel data outputted from the vehicle 30.

The vehicle 30 includes the state measuring unit 301, the vehicle speed measuring unit 302, the communication unit 303, and the battery ECU 304. The state measuring unit 301 derives, from the battery ECU 304, a SOC (State of charge) of a battery used to drive the vehicle. The communication unit 303 transmits the SOC to the travel data storage unit 204. The measuring unit 301 also derives the position of the vehicle 30 which is transmitted in the form of position information to the travel data storage unit 204 from the communication unit 303. The vehicle speed measuring unit 302 measures the speed of the vehicle 30 which is transmitted from the communication unit 303 to the travel data storage unit 204.

Figure 2:
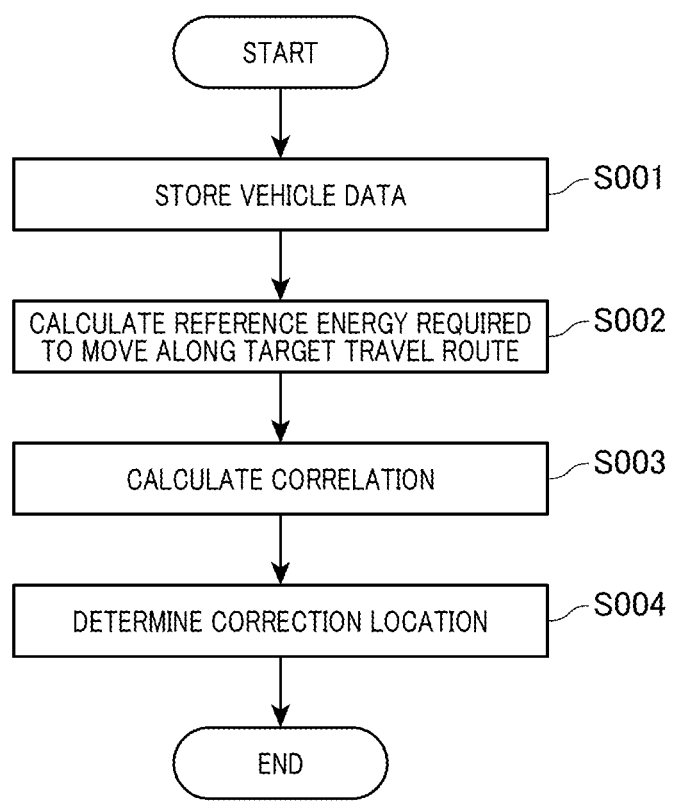
FIG. 2 is a flowchart of a sequence of tasks in a correction operation of the energy consumption predicting apparatus in FIG. 1.
Figure 3:
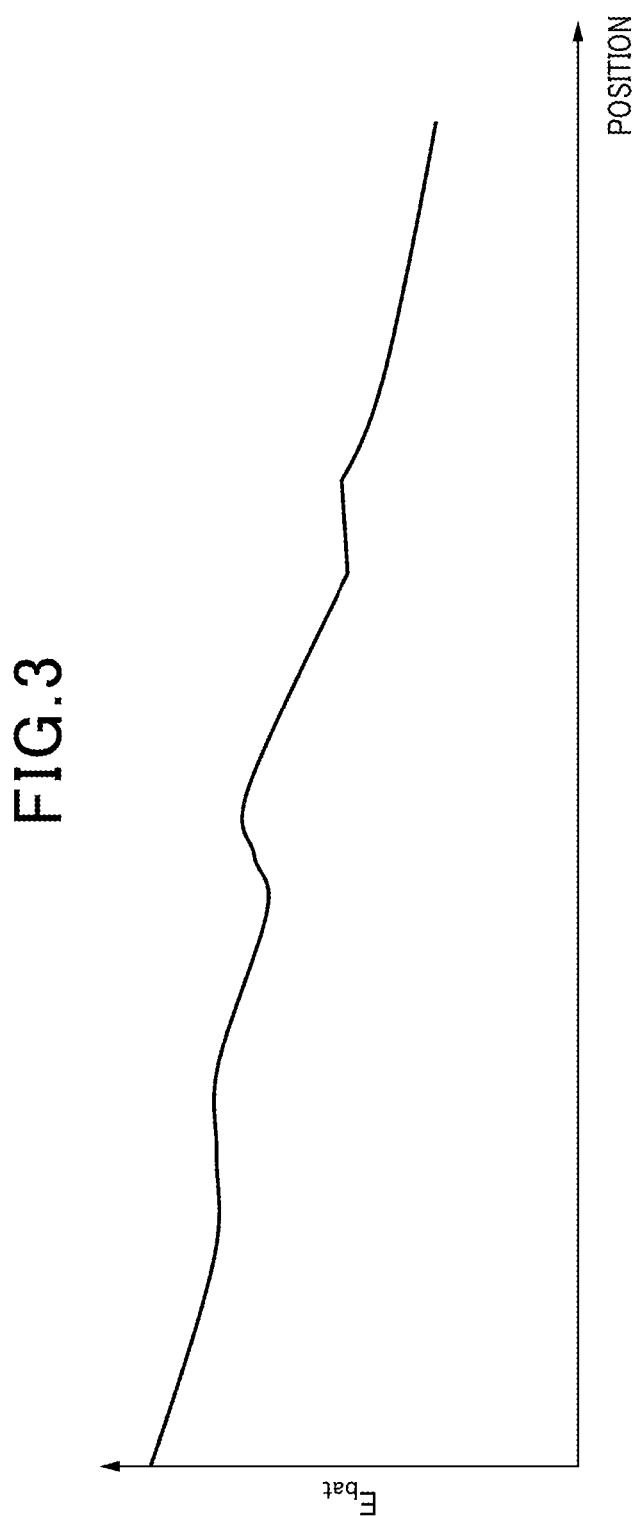
FIG. 3 is a view which demonstrates an example of a relation between information about a position of a vehicle traveling on a road and a state of charge of a battery installed in the vehicle.
Figure 4:
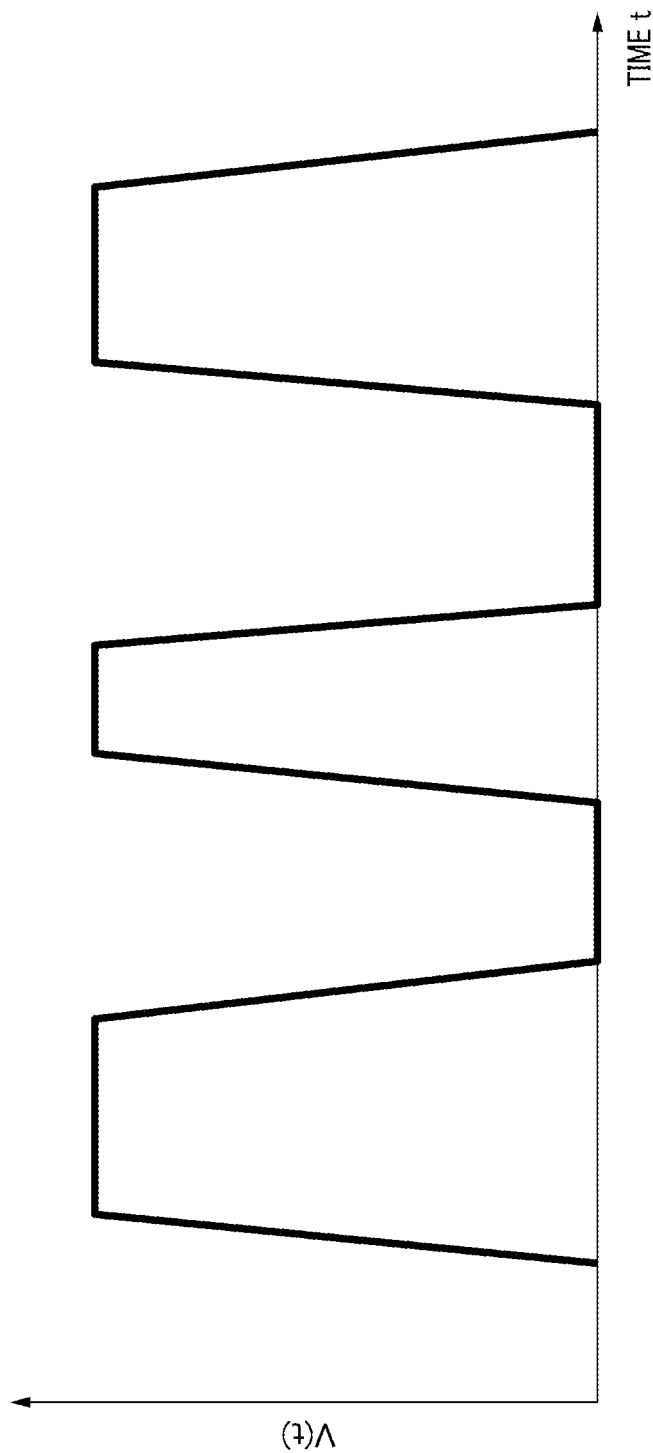
FIG. 4 is a view which demonstrates an example of a relation between a variation in speed of a vehicle and time of day.

The energy consumption predicting apparatus 10 executes a sequence of logical steps, as illustrated in FIG. 2, to process information. First, in step S001, the energy information retaining unit 103 derives the position information and the state of charge $E_{bat}(t)$ of the battery from a traveling vehicle(s) and stores them therein. The traveling vehicle 30 is designed to output the position information and the state of charge $E_{bat}(t)$ at a constant or variable time interval to the energy consumption predicting apparatus 10. The energy information retaining unit 103 stores a plurality of items of the position information and a plurality of values of the state of charge $E_{bat}(t)$ obtained several times form the traveling vehicle(s). The energy information retaining unit 103 may store the items of the position information and the values of the state of charge $E_{bat}(t)$ in the form of a map, as demonstrated in FIG. 3, which represents a relation between the items of the position information and the values of the state of charge $E_{bat}(t)$. After completion of the operations in step S001, the routine proceeds to step S002.

In step S002, the energy information generator 101 produces the reference energy information which represents the reference energy $E_{total\_prd\_base}$ that is an amount of electrical energy required by a vehicle to move to, for example, a destination (i.e., target location) from a start location (i.e., the reference location) of the vehicle 30 along a selected travel route. The energy information generator 101 may use the map representing the relation between the position information and the state of charge $E_{bat}(t)$ derived in step S001 to determine the decreasing state of charge $E_{bat}(t)$ as the reference energy information indicating the reference energy $E_{total\_prd\_base}$ that is an amount of energy required by a vehicle to move on the road.

The energy information generator 101 may calculate a typical vehicle speed pattern v(t) that is a variation in speed of a typical vehicle and produce the reference energy information representing the reference energy $E_{total\_prd\_base}$ as a function of the typical vehicle speed pattern v(t).

Specifically, a travel resistance $F_{drv}(t)$ is calculated according to Eq. f01 below.

$$F_{drv}(t)=Wa(t)+0.5*p*Cd*Av^2(t)+\mu Wg+Wg \sin \theta(t) \quad \text{f01}$$

Where t is time, W is total weight of a vehicle, a(t) is rate of acceleration of the vehicle at time t, ρ is density of air, Cd is coefficient of air resistance, A is frontal projected area of the vehicle, v(t) is speed at time t, μ is coefficient of rolling resistance, g is acceleration of gravity, and θ(t) is a slop or inclination of a road between a stop at time t and a location at time t−1.

The air density ρ may be selected as a fixed value of 1.293 kg/m³. The air density ρ may be calculated as a function of the temperature of air or ambient temperature. The gravity acceleration g may be selected as a fixed value of 9.8 m/s². The inclination θ(t) may be derived using information about a latitude, a longitude, and an altitude of the travel route. Such information about the travel route is stored as travel route information in the travel route storage unit 202. The vehicle parameters W, Cd, A, and μ may be derived by reading information out of the vehicle characteristic storage unit 201 and set to, for example, the following values.

W: 2,000 kg
Cd: 0.3
A: 5 m²
μ: 0.1

A travel horsepower $P_{drv}(t)$ is calculated according to Eq. f02 below.

$$P_{drv}(t)=F_{drv}(t)*v(t) \quad \text{f02}$$

Figure 5:
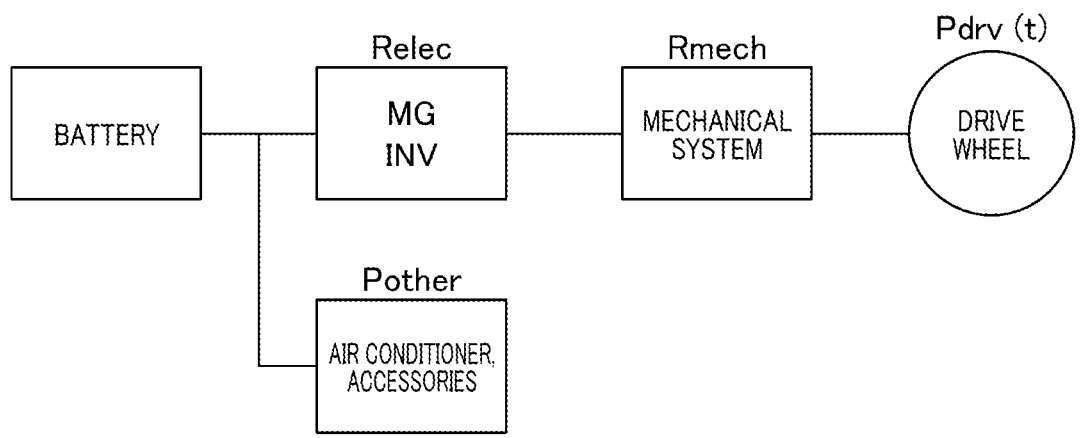
FIG. 5 is a block diagram which illustrates a structure of an electrical vehicle whose consumption of energy is to be predicted.

FIG. 5 exemplifies a system which is installed in an electric automobile and includes a storage battery, an electrical system MG-INV, a mechanical system, and an air conditioner or accessories. In the system in FIG. 5, the electrical system MG-INV has a system efficiency $R_{elec}$. The mechanical system has a efficiency $R_{mech}$ which may be set to a fixed value of 70%. The efficiency $R_{mech}$ of the mechanical system is defined as indicating that energy inputted to the mechanical system is transmitted to a drive wheel of the electric automobile with the efficiency $R_{mech}$ to create the travel horsepower $P_{drv}(t)$. The energy $P'_{drv}(t)$ inputted to the mechanical system may, therefore, be calculated according to Eq. f03 below.

$$P'_{drv}(t)=P_{drv}(t)/R_{mech} \quad \text{f03}$$

Figure 6:
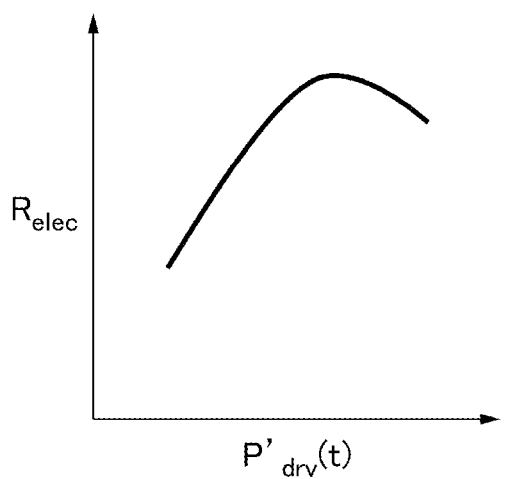
FIG. 6 is a view which demonstrates an example of an efficiency of an electrical system used to calculate a consumption of energy.

The efficiency $R_{elec}$ of the electrical system is defined as a function of the amount of energy inputted from the electrical system to the mechanical system to meet, for example, a relation illustrated in FIG. 6. The efficiency $R_{elec}$ of the electrical system may be calculated according to Eq. f04 below which is a function of the energy $P'_{drv}(t)$ inputted to the mechanical system.

$$R_{elec}=f(P'_{drv}(t)) \quad \text{f04}$$

The power $P''_{drv}(t)$ for moving the automobile may be calculated according to Eq. f05.

$$P''_{drv}(t)=P'_{drv}(t)/R_{elec}(P'_{drv}(t)) \quad \text{f05}$$

By summing Eq. f05 until time t, the travel energy $E_{drv\_prd\_base}$ is derived according to Eq. f06.

$$E_{drv\_prd\_base}=\Sigma(P''_{drv}(t)*(t-(t-1))) \quad \text{f06}$$

where when $P''_{drv}(t)<0$, the travel energy $E_{drv\_prd\_base}$ IS stored in the battery in the form of regenerative energy.

The power for driving an air conditioner or other accessories installed in the automobile is defined as $P_{other}(t)$. The power $P_{other}(t)$ may be set to a fixed value of 5 kW. By summing the power $P_{other}(t)$ until time t, a travel-excluding energy $E_{other\_pre\_base}$ may be calculated according to Eq. f07 below.

$$E_{other\_pre\_base}=\Sigma(P_{other}(t)*(t-(t-1))) \quad \text{f07}$$

A total amount of electrical energy (i.e., the reference energy) required by the automobile to travel until time t is calculated according to Eq. f08 below which is obtained using Eqs. f06 and f07.

$$E_{total\_prd\_base}(t)=E_{drv\_prd\_base}(t)+E_{other\_prd\_base}(t) \quad \text{f08}$$

Figure 7:
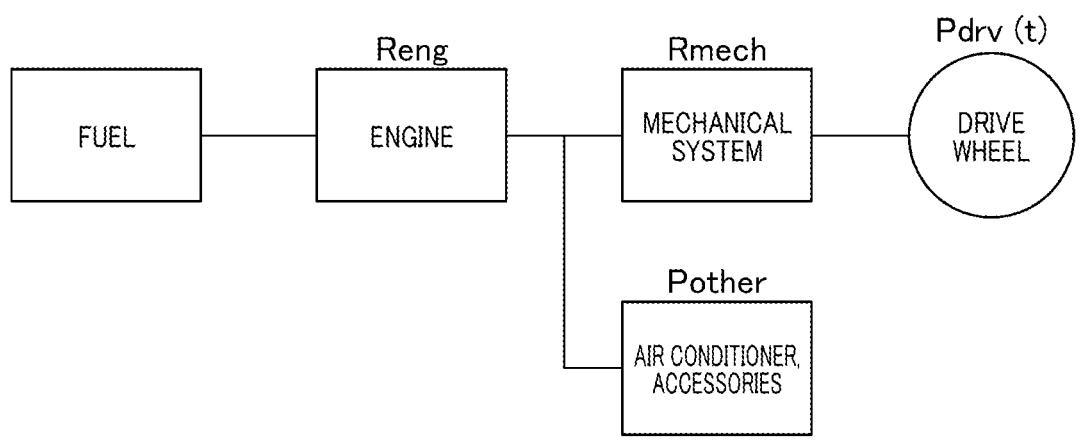
FIG. 7 is a block diagram which illustrates a structure of an engine-powered vehicle whose consumption of energy is to be predicted.

The energy consumption predicting apparatus 10 in this embodiment may be used with an engine-powered automobile instead of the electrical automobile. The engine-power automobile is equipped with, for example, an internal combustion engine. FIG. 7 demonstrates a system installed in an engine-powered automobile. The engine efficiency is defined as $R_{eng}$. The efficiency of the mechanical system is defined as $R_{mech}$. The efficiency $R_{mech}$ of the mechanical system may be set to a fixed value of 70%. The efficiency $R_{mech}$ of the mechanical system is defined as indicating that energy inputted to the mechanical system is transmitted to a drive wheel of the engine-powered automobile with the efficiency $R_{mech}$ to create the travel horsepower $P_{drv}(t)$. The energy $P'_{drv}(t)$ inputted to the mechanical system may, therefore, be calculated according to Eq. f09 below.

$$P'_{drv}(t)=P_{drv}(t)/R_{mech} \qquad \text{f09}$$

The engine, such as an internal combustion engine, supplies electrical energy used in actuating an air conditioner and/or other accessories installed in the automobile in addition to that used in moving the automobile. The amount of electrical energy required to operate the air conditioner and/or other accessories is defined as $P_{other}(t)$. The energy $P_{other}(t)$ may be set to a fixed value of 5 kW.

Figure 8:
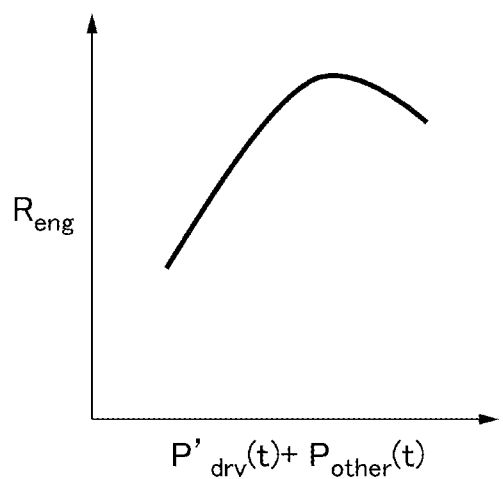
FIG. 8 is a view which demonstrates an example of an efficiency of an engine used to calculate a consumption of energy.

The engine efficiency $R_{eng}$ is defined as a function of the amount of energy inputted to the mechanical system and that used to operate the accessories to meet, for example, a relation illustrated in FIG. 8. The engine efficiency $R_{eng}$ may be calculated according to Eq. f10 below which is a function of the energy $P'_{drv}(t)+P_{other}(t)$.

$$R_{eng}=g(P'_{drv}(t)+P_{other}(t)) \qquad \text{f10}$$

where g is a given function between parameters in a vertical axis and a horizontal axis of the graph in FIG. 8.

Eqs. f09 and f10 are added together to derive Eqs. f11 and f12 below for use in calculating the total amount of energy $P'_{sum}(t)$.

$$P_{sum}(t)=P'_{drv}(t)+P_{other}(t) \qquad \text{f11}$$

$$P'_{sum}(t)=P_{sum}(t)/R_{eng}(P_{sum}(t)) \qquad \text{f12}$$

The engine-powered automobile is usually designed not to store regenerative energy in a battery and thus uses only a positive value of the total amount of energy $P'_{sum}(t)$ which is given by Eq. f13 below.

$$P''_{sum}(t)=P'_{sum}(t)(P'_{sum}(t)>0) \qquad \text{f13}$$

$P''_{sum}(t)$ is summed with time to calculate the required amount of electrical energy $E_{total\_prd\_base}$ (i.e., the reference energy) according to Eq. f14 below.

$$E_{total\_prd\_base}(t)=\Sigma(P''_{sum}(t)*(t-(t-1))) \qquad \text{f14}$$

The amount of energy (i.e., the travel energy) required to move the automobile is expressed according to Eq. f15 below. The amount of energy required to other than move the automobile, for example, actuate the accessories installed in the automobile is expressed according to Eq. f16 below.

$$E_{drv\_prd\_base}(t)=E_{total\_prd\_base}(t)*(P'_{drv}(t)/P'_{sum}(t)) \qquad \text{f15}$$

$$E_{other\_prd\_base}(t)=E_{total\_prd\_base}(t)-E_{drv\_prd\_base}(t) \qquad \text{f16}$$

Figure 9:
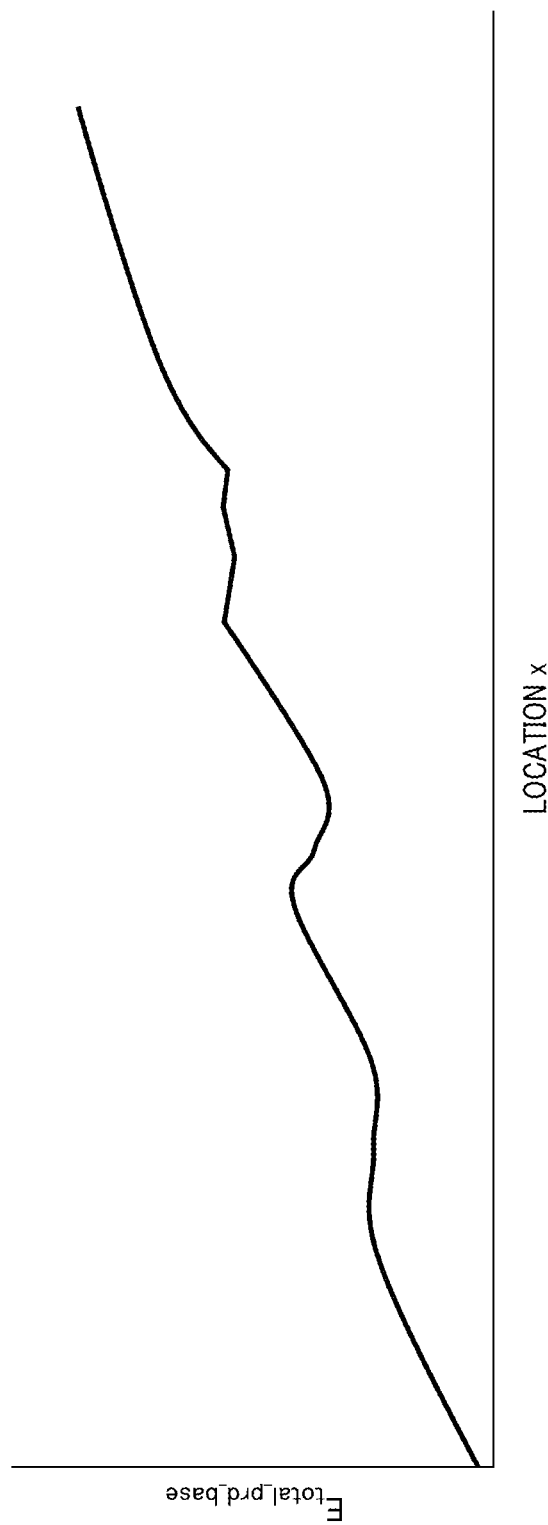
FIG. 9 is a graph which demonstrates an example of calculated reference energy.

FIG. 9 demonstrates a relation between the reference energy $E_{total\_prd\_base}$ determined by the energy information generator 101 and the position of a corresponding vehicle. After completion of the operation in step S002 in FIG. 2, the routine proceeds to step S003.

In step S003, the correcting unit 102 calculate the coefficient of correlation (which will also be referred to below as a correlation factor) Kn where n denotes a location on the road). The correlation factor kn represents a correlation between an amount of energy actually consumed until the first location (i.e., the target location) is reached and an amount of energy actually consumed until the second location (which will also be referred to below as a location n) is reached. The second location is located closer to the start location than the first location is along the selected travel route.

Figure 10A:
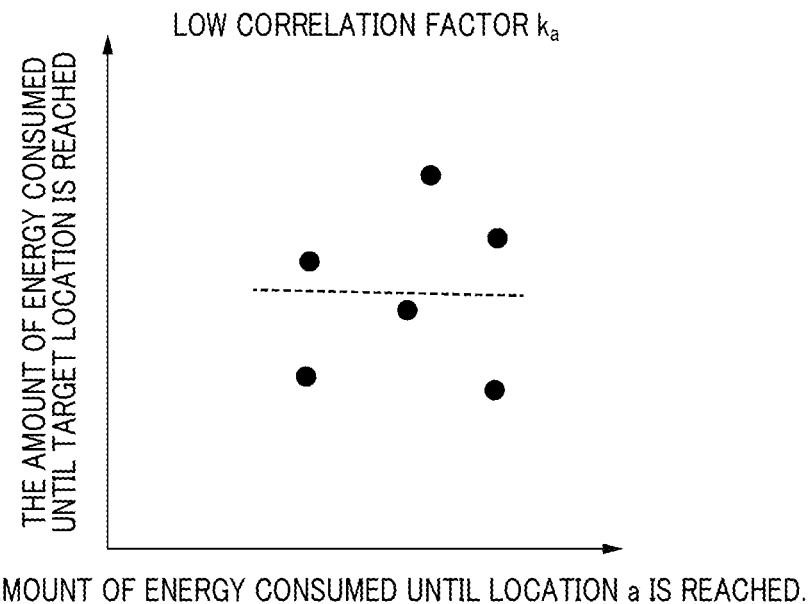
FIGS. 10(A) and 10(B) are graphs which demonstrate examples of correlations regarding consumed amounts of energy.

FIG. 10(A) demonstrates a correlation between an amount of energy consumed until the location a (i.e., the second location) and an amount of energy consumed until the target location. The illustrated correlation shows that the amount of energy consumed until the target location changes in some cases when the amount of energy consumed until the location a remains unchanged, while the amount of energy consumed until the target location is reached remains unchanged in some cases when the amount of energy consumed until the location a is reached changes. The correlation factor ka in this case is, therefore, low.

Figure 10B:
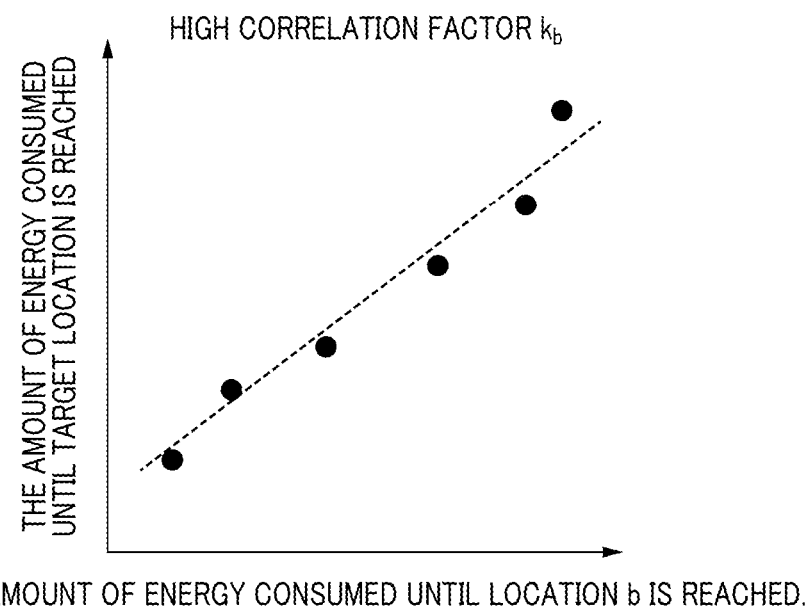

FIG. 10(B) demonstrates a correlation between an amount of energy consumed until a location b (i.e., second location) and an amount of energy consumed until the target location. The illustrated correlation shows a one-to-one correspondence between the amount of energy consumed until the location b and that until the target location. The correlation factor kb in this case is, therefore, high.

After completion of the operation in step S003 in FIG. 2, the routine proceeds to step S004 wherein the correcting unit 102 determines the correction location. Specifically, the correcting unit 102 determines a location on the road where the correlation factor kn is maximized as the correction location. For example, the correcting unit 102 may determines a plurality of locations whose correlation factors kn are higher than or equal to a given value, e.g., 0.6 as the correction locations.

How to correct the reference energy when the target vehicle by which an amount of energy expected to be consumed is moving along a selected travel route will be described with reference to FIG. 11.

After entering the program in FIG. 11, the routine proceeds to step S015 wherein the energy information generator 101 produces the reference energy information representing the reference energy $E_{total\_prd\_base}$ required by a vehicle to move along a selected travel route. The operation in step S015 is substantially identical with that in step S002, and explanation thereof in detail will be omitted here. After completion of the operation in step S015, the routine proceeds to step S016.

In step S016, the correcting unit 102 determines whether the target vehicle has reached the correction location. If a NO answer is obtained meaning that the target vehicle does not yet reach the correction location, then the routine repeats step S016.

If a YES answer is obtained in step S016 meaning that the target vehicle has reached the correction location, the correcting unit 102 calculates a correction parameter $R_{ir}$. In the following discussion, the location the target vehicle has reached will be referred to as a correction location $X_i$. The correction parameter $R_{ir}$ is given by Eq. f17 below.

$$R_{ir}=E_{total\_use}(X_i)/E_{total\_prd\_base}(X_i) \qquad \text{f17}$$

The correction parameter $R_{ir}$ is, therefore, expressed by a parameter of a ratio between $E_{total\_use}(X_i)$ and $E_{total\_prd\_base}(X_i)$.

The correcting unit 102 may determine the correction parameter $R_{ir}$ as a function of a difference between $E_{total\_use}(X_i)$ and $E_{total\_prd\_base}(X_i)$ according to Eq. f18 below.

$$R_{id}=E_{total\_use}(X_i)-E_{total\_prd\_base}(X_i) \qquad \text{f18}$$

$E_{total\_prd\_base}(X_i)$, as can be seen in FIG. 12, represents the reference energy, i.e., the second reference energy that is an amount of energy calculated as being required until to the location $X_i$ (i.e., the second location) is reached. $E_{total\_use}(X_i)$ represents an amount of energy actually consumed by the target vehicle until the location $X_i$ is reached (which will also be referred to as an actual amount of energy or simply to as actual energy). After completion of the operation in step S016, that is, the correction parameter $R_{ir}$ is calculated, the routine proceeds to step S017.

In step S017, the correcting unit 102 corrects the reference energy information. Specifically, the correcting unit 102 corrects the reference energy using the correction parameter $R_{ir}$ according to Eq. f19 below to finally derive a predicted energy $E_{total\_prd\_base\_cor}(X_{end})$.

$$E_{total\_prd\_base\_cor}(X_{end}) = R_{ir} \times E_{total\_prd\_base}(X_{end}) \qquad \text{f19}$$

$E_{total\_prd\_base}(X_{end})$, as can be seen in FIG. 12, represents the reference energy, i.e., the first reference energy that is an amount of energy required until the location $X_{end}$ (i.e., the first location) is reached.

The correcting unit 102 may correct the reference energy using the correction parameter $R_{id}$ according to Eq. f20 to calculate the predicted energy $E_{total\_prd\_base\_cor}(X_{end})$.

$$E_{total\_prd\_base\_cor}(X_{end}) = R_{id} + E_{total\_prd\_base}(X_{end}) \qquad \text{f20}$$

After completion of the operation in step S017, the routine proceeds to step S018.

In step S018, the energy information output unit 104 outputs a signal indicating the predicted energy $E_{total\_prd\_base\_cor}(X_{end})$. For instance, the energy information output unit 104 may inform a user or operator in the target vehicle or another system of the predicted energy $E_{total\_prd\_base\_cor}(X_{end})$.

The determination of the correction location(s) may be achieved in another wary, which will be described below, instead of that discussed with reference to FIG. 2.

A first modified way of how to determine the correction location will be described below. Specifically, in the step S002 in FIG. 2, the energy information retaining unit 103 stores traffic information including information on a traffic flow on the travel route therein. The traffic flow is expressed by, for example, a value derived by summing the number of automobiles passing a given location on the road for a selected period of time. FIG. 13 is a graph which demonstrates an example of a relation of a change in traffic flow to a location X. The illustrated example shows a period of time in which the traffic flow indicates 10 automobiles/time around the location $X_i$ and a period of time in which the traffic flow indicates 300 automobiles/time around the location $X_j$. A great variation in traffic flow exists between the locations $X_i$ and $X_j$. The illustrated example also shows a period of time in which the traffic flow indicates 20 automobiles/time around a location other than the locations $X_i$ and $X_j$ and a period of time in which the traffic flow indicates 25 automobiles/time around a location other than the locations $X_i$ and $X_j$. A variation in traffic flow between those locations is small. In the example in FIG. 13, a variation in traffic flow between the locations $X_i$ and $X_j$ is great, so that each of the locations $X_i$ and $X_j$ is selected as the correction location in step S004 in FIG. 2.

A second modified way of how to determine the correction location will be described below. Specifically, in the step S002 in FIG. 2, the energy information retaining unit 103 stores data on a pattern of speeds of vehicles therein. This speed pattern data is derived by a combination of data on variations in speed of a plurality of vehicles which are transmitted from the vehicles to the energy information retaining unit 103. One example of the speed pattern data is demonstrated in a graph in FIG. 14.

Figure 14:
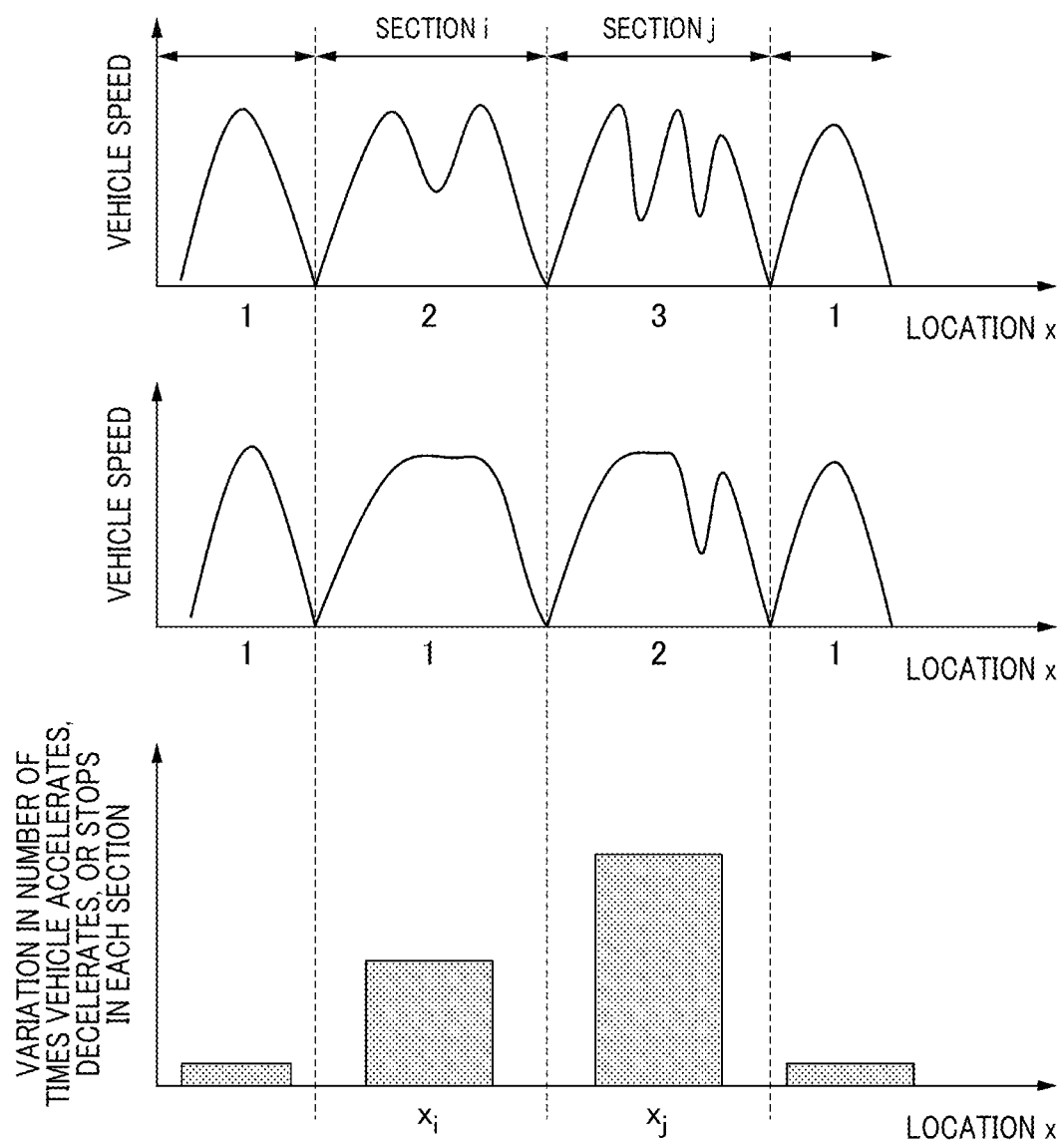
FIG. 14 a view which represents graphs for use in determining a correction location on a selected travel route.

For the brevity of disclosure, the speed pattern data demonstrated in FIG. 14 represents two patterns of speeds of vehicles. The upper speed pattern in FIG. 14 shows that the vehicle accelerates or decelerates two times in the section i of the road and accelerates or decelerates three times in the section j. The lower speed pattern shows that the vehicle accelerates or decelerates one time in the section i and accelerates or decelerates two times in the section j. Summing the number of times the vehicle accelerates, decelerates, or stops in each of the sections i and j, a total of three times will be in the section i, and a total of five times will be in the section j. The numbers of times the vehicle accelerates, decelerates, or stops in the sections i and j are higher than those in other sections, so that each of the location $X_i$ in the section i and the location $X_j$ in the section j is selected as the correction location.

Figure 15:
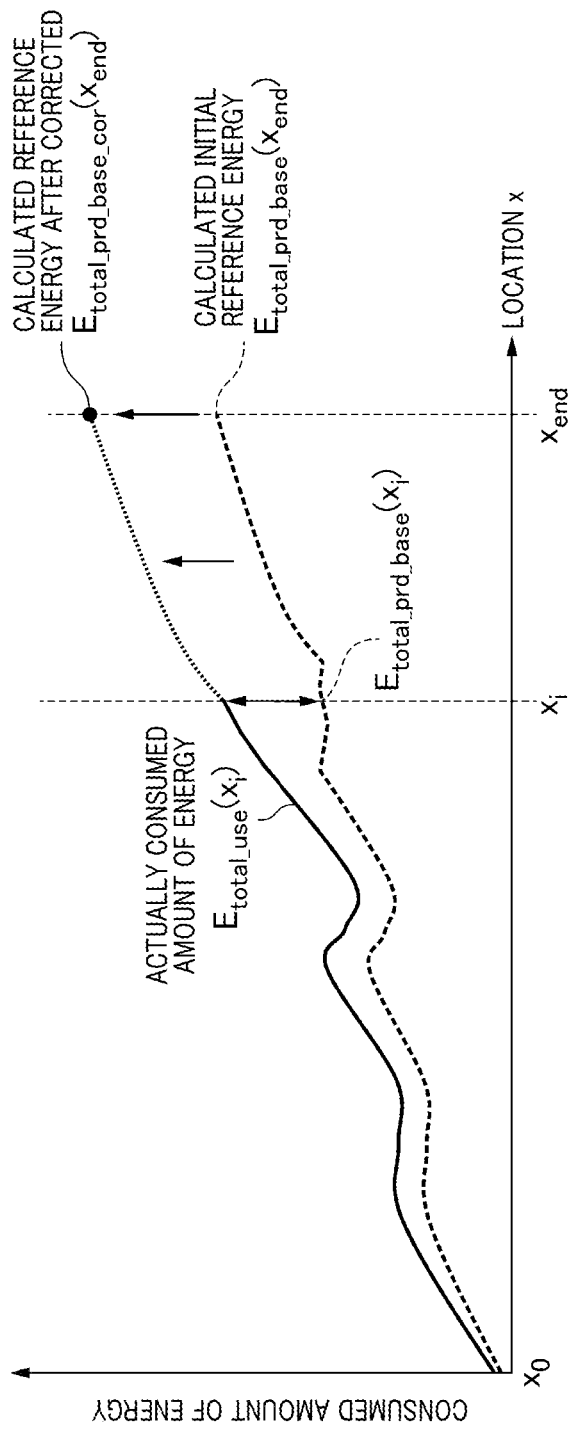
FIG. 15 is a graph which demonstrates how to calculate a predicted consumption of energy.

A third modified way of how to determine the correction location will be described below. Specifically, in step S015 in FIG. 11, the energy information generator 101 produces the reference energy information which indicates the reference energy $E_{total\_prd\_base}$. The correcting unit 102 derives the actual energy $E_{total\_use}(X_i)$ that is an amount of energy actually consumed by the target vehicle until the location $X_i$ is reached. The correcting unit 102 then compares the reference energy $E_{total\_prd\_base}(X_i)$ required until the location $X_i$ is reached with the actual energy $E_{total\_use}(X_i)$ to calculate a deviation therebetween as the deviation parameter. The deviation parameter is expressed by a ratio or a difference between the reference energy $E_{total\_prd\_base}(X_i)$ and the actual energy $E_{total\_use}(X_i)$. When the deviation parameter, as demonstrated in FIG. 15, exceeds a given value, the correcting unit 102 corrects the reference energy $E_{total\_prd\_base}(X_{end})$ required until the location $X_{end}$ is reached to determine the predicted energy $E_{total\_prd\_base\_cor}(X_{end})$.

Figure 16A:
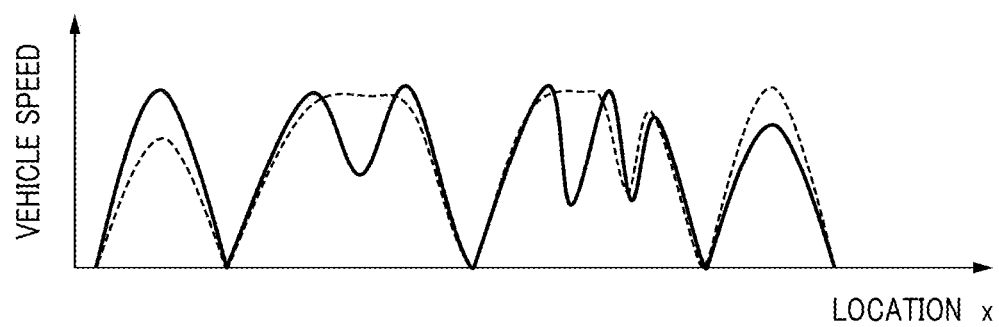
FIG. 16(A) is a graph which represents a relation between a vehicle speed and a location on a selected travel route.
Figure 16B:
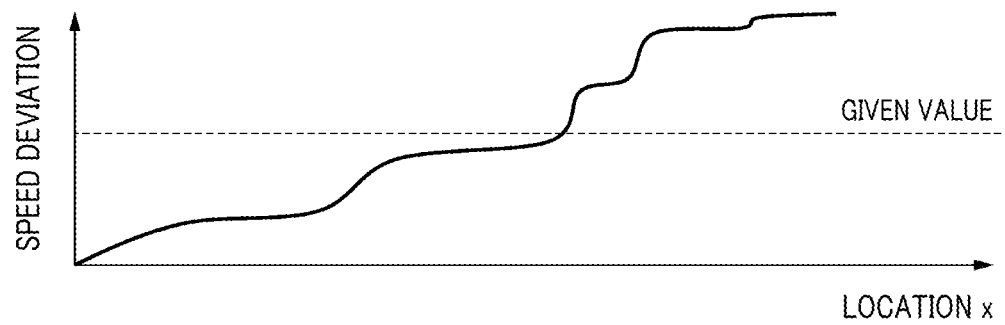
FIG. 16(B) is a graph which represents a relation of a deviation of an actually consumed amount of energy from a calculated amount with a location on a selected travel route.

A fourth modified way of how to determine the correction location will be described below. Specifically, the energy information retaining unit 103 stores therein a reference speed pattern which represents a variation in speed at which a vehicle is expected to move in a selected section of the road (i.e., the selected travel route). The energy information retaining unit 103 calculates a deviation of the reference speed pattern from an actual speed pattern that is a speed at which a vehicle (e.g., the vehicle 30 or another vehicle) has actually moved on the selected section of the road and sums it as a total speed deviation. A location on the road where the total speed deviation exceeds a given value is determined as the correction location. FIG. 16(A) demonstrates an example of a vehicle speed pattern. FIG. 16(B) represents an example of a deviation between the expected speed of a vehicle and the actual speed of the vehicle. In FIG. 16(A), a broke line indicates the reference speed pattern. A solid line indicates a pattern of the actual speed of the vehicle. By summing a deviation between the reference speed pattern and the actual speed pattern, deviation data (i.e., the total speed deviation) illustrated in FIG. 16(B) is obtained.

As apparent from the above discussion, this disclosure is capable of realizing several modes of the energy consumption predicting apparatus 10 which will be described below. The following modes of the energy consumption predicting apparatus 10 may be combined unless otherwise technically contradicting each other.

First Mode

The energy consumption predicting apparatus 10 may comprise: (a) the energy information retaining unit 103 which retains therein reference energy information which represents reference energy defined by an amount of energy expected to be required by a vehicle to move along a selected travel route; (b) the energy information generator 101 which generates actual energy information which represents actual energy defined by an amount of energy actually used by a target vehicle when the target vehicle has moved along the selected travel route, the target vehicle being a vehicle whose consumption of energy required to be predicted; and (c) the correcting unit 102 which works to calculate a deviation parameter which represents a deviation of the actual energy from the reference energy. The correcting unit derives a correlation factor that is a function of a correlation between an amount of energy actually consumed by a vehicle to move from a reference location to a first location and an amount of energy actually consumed by a vehicle to move from the reference location to a second location. When the correlation factor is higher than a given value, the correcting unit determines the second location as a correction location and determines a correcting parameter as a function of the deviation parameter derived at the correction location. The correcting unit corrects the reference energy using the correction factor to produce predicted energy information representing an amount of energy predicted to be consumed by the target vehicle until a target location that is the first location is reached.

The first mode is designed to determine, as the correction location, a location on the selected travel route where the correlation factor which improves the accuracy in predicting the corrected reference energy is high, thereby enabling the reference energy information to be corrected at an optimum time (i.e., correction time) which ensures the high accuracy of prediction of an amount of energy consumed by the target vehicle regardless of a variation in actually consumed amount of energy.

Second Mode

The energy consumption predicting apparatus 10 in the first mode may be designed to have the energy information retaining unit 103 which retains therein first reference energy in the form of the reference energy information which represents the amount of energy expected to be required by a vehicle to move along the selected travel route until the first location is reached. The correcting unit 102 determines a difference between second reference energy and actual energy as the deviation parameter. The second reference energy is an amount of energy expected to be required by a vehicle to move to the second location which is closer to the reference location than the first location is on the selected travel route. The actual energy is an amount of energy actually used in the target vehicle until the second location is reached. When the deviation parameter is higher than a given value, the correcting unit 102 corrects the first reference energy to produce the predicted energy information.

The second mode is designed to determine a difference between the reference energy and the actual energy as the deviation parameter and, when the deviation parameter is higher than a given value, corrects the reference energy to produce the predicted energy information. In other words, the second mode enables the reference energy not to be corrected even when the correction time is reached, thereby enhancing the accuracy in producing the predicted reference energy information.

Third Mode

The energy consumption predicting apparatus 10 in the second mode may be designed to have the energy information retaining unit 103 which retains therein correlation information which represents a correlation between the amount of energy actually consumed by the vehicle to move until the second location is reached and the amount of energy actually consumed by the vehicle to move until the first location is reached. The correcting unit determines the correlation factor using the correlation information.

The third mode is designed to determine the correction for use in determining whether the second location should be selected as the correction location based on the actually consumed amount of energy, thereby enhancing the accuracy in producing the predicted reference energy information.

Fourth Mode

The energy consumption predicting apparatus 10 in the second or third mode may be designed so that when a change in traffic state at the second location is determined to be greater than that at another location on the selected route, the correcting unit 102 determines the second location as the correction location.

The fourth mode is designed to determine, as the correction location, the second location which has a greater variation in traffic state than another location on the selected travel route, thereby enabling the predicted reference energy information to be produced as a function of the change in traffic state, which increases the accuracy in producing the predicted reference energy information.

Fifth Mode

The energy consumption predicting apparatus 10 in the second or third mode may be designed so that when a change in pattern of a vehicle speed at the second location is determined to be greater than that at another location along the selected travel route, the correcting unit 102 determines the second location as the correction location.

The fifth mode is designed to determine, as the correction location, the second location which has a greater variation in vehicle speed than another location on the selected travel route, thereby enabling the predicted reference energy information to be produced as a function of the variation in vehicle speed, which increases the accuracy in producing the predicted reference energy information.

Sixth Mode

The energy consumption predicting apparatus 10 in the second or third mode may be designed so that when a deviation of the actual energy from the reference energy which is derived until the second location is reached is determined to be greater than a given value, the correcting unit 102 determines the second location as the correction location. The sixth mode is designed to determine, as the correction location, the second location which has the deviation higher than the given value, thereby eliminating the need for determining the correction location in advance and enabling the second location where the deviation which usually changes in time has become high to be selected as the correction location on the selected travel route.

Seventh Mode

The energy consumption predicting apparatus 10 in the first mode may be designed to have the energy information retaining unit 103 which retains therein information which is used to calculate the reference energy and represents a reference speed pattern indicating a variation in speed at which a vehicle moves until the first location is reached along the selected travel route. The correcting unit 102 determines, as the deviation parameter, a difference between a reference speed pattern and an actual speed pattern. The reference speed pattern indicates a variation in speed of a vehicle moving until the second location closer to the reference location than the first location is along the selected travel route. The actual speed pattern indicates a variation in speed at which the target vehicle has actually moved to the second location. When the deviation parameter is greater than a given value, the correcting unit 102 corrects the reference energy information to produce the predicted energy information.

The seventh mode is designed to determine, as the correction location, the second location which has the high deviation, thereby eliminating the need for determining the correction location in advance and enabling the second location where the deviation which usually changes in time has become high to be selected as the correction location on the selected travel route.

The operations of each controller, device, or unit referred to in this disclosure may be realized by a special purpose computer which is equipped with a processor and a memory and programmed to execute one or a plurality of tasks created by computer-executed programs or alternatively established by a special purpose computer equipped with a processor made of one or a plurality of hardware logical circuits. The controller(s), device(s), or unit(s) and operations thereof may alternatively be realized by a combination of an assembly of a processor with a memory which is programmed to perform one or a plurality of tasks and a processor made of one or a plurality of hardware logical circuits. Computer-executed programs may be stored as computer executed instructions in a non-transitory computer readable medium. The means for performing the functions of parts of the controller need not necessarily include software, but may be realized one or a plurality of hardware devices.

The present disclosure has been described above on the basis of embodiments and modifications, but the embodiments of the invention described above are for facilitating the understanding of the present disclosure and do not limit the present disclosure. The present disclosure can be modified and improved without departing from the sprit and the scope of the claims, and the present disclosure include equivalents thereof.

What is claimed is:

1. An energy consumption predicting apparatus comprising:
    an energy information retaining unit which retains therein reference energy information which represents reference energy defined by an amount of energy expected to be required by a vehicle to move along a selected travel route;
    an energy information generator which generates actual energy information which represents actual energy defined by an amount of energy actually used by a target vehicle when the target vehicle has moved along the selected travel route, the target vehicle being a vehicle whose consumption of energy is required to be predicted; and
    a correcting unit which works to calculate a deviation parameter which represents a deviation of the actual energy from the reference energy,
    the correcting unit deriving a correlation factor that is a function of a correlation between an amount of energy actually consumed by a vehicle to move from a reference location to a first location and an amount of energy actually consumed by a vehicle to move from the reference location to a second location,
    when the correlation factor is higher than a given value, the correcting unit determining the second location as a correction location and determining a correcting parameter as a function of the deviation parameter derived at the correction location,
    the correcting unit correcting the reference energy using the correction factor to produce predicted energy information representing an amount of energy predicted to be consumed by the target vehicle until a target location that is the first location is reached.

2. The energy consumption predicting apparatus as set forth in claim 1, wherein the energy information retaining unit retains therein first reference energy in a form of the reference energy information which represents the amount of energy expected to be required by a vehicle to move along the selected travel route until the first location is reached,
    the correcting unit determining a difference between second reference energy and actual energy as the deviation parameter, the second reference energy being an amount of energy expected to be required by a vehicle to move to the second location which is closer to the reference location than the first location is on the selected travel route, the actual energy being an amount of energy actually used in the target vehicle until the second location is reached,
    when the deviation parameter is higher than a given value, the correcting unit correcting the first reference energy to produce the predicted energy information.

3. The energy consumption predicting apparatus as set forth in claim 2, wherein the energy information retaining unit retains therein correlation information which represents a correlation between the amount of energy actually consumed by the vehicle to move until the second location is reached and the amount of energy actually consumed by the vehicle to move until the first location is reached,
    the correcting unit determining the correlation factor using the correlation information.

4. The energy consumption predicting apparatus as set forth in claim 2, wherein when a change in traffic state at the second location is determined to be greater than that at another location on the selected route, the correcting unit determines the second location as the correction location.

5. The energy consumption predicting apparatus as set forth in claim 2, wherein when a change in pattern of a vehicle speed at the second location is determined to be greater than that at another location along the selected travel route, the correcting unit determines the second location as the correction location.

6. The energy consumption predicting apparatus as set forth in claim 2, wherein when a deviation of the actual energy from the reference energy which is derived until the second location is reached is determined to be greater than a given value, the correcting unit determines the second location as the correction location.

7. The energy consumption predicting apparatus as set forth in claim 1, wherein the energy information retaining unit retains therein information which is used to calculate the reference energy and represents a reference speed pattern indicating a variation in speed at which a vehicle moves until the first location is reached along the selected travel route,
    the correcting unit determines, as the deviation parameter, a difference between a reference speed pattern and an actual speed pattern, the reference speed pattern indicating a variation in speed of a vehicle moving until the second location closer to the reference location than the first location is along the selected travel route, the actual speed pattern indicating a variation in speed at which the target vehicle has actually moved to the second location,
    when the deviation parameter is greater than a given value, the correcting unit corrects the reference energy information to produce the predicted energy information.

8. The energy consumption predicting apparatus as set forth in claim 3, wherein when a change in traffic state at the second location is determined to be greater than that at another location on the selected route, the correcting unit determines the second location as the correction location.

9. The energy consumption predicting apparatus as set forth in claim 3, wherein when a change in pattern of a vehicle speed at the second location is determined to be greater than that at another location along the selected travel route, the correcting unit determines the second location as the correction location.

10. The energy consumption predicting apparatus as set forth in claim 3, wherein when a deviation of the actual energy from the reference energy which is derived until the second location is reached is determined to be greater than a given value, the correcting unit determines the second location as the correction location.

* * * * *